A. E. HALL.
SHOCK ABSORBER.
APPLICATION FILED JUNE 24, 1913.
1,102,265.
Patented July 7, 1914.
2 SHEETS—SHEET 1.
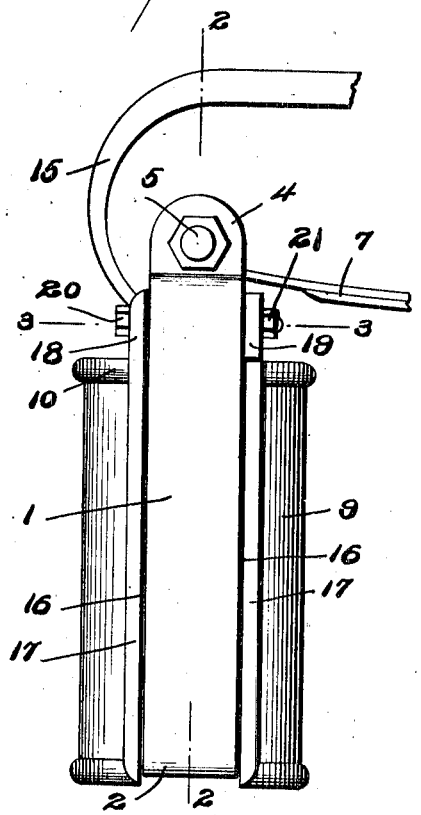
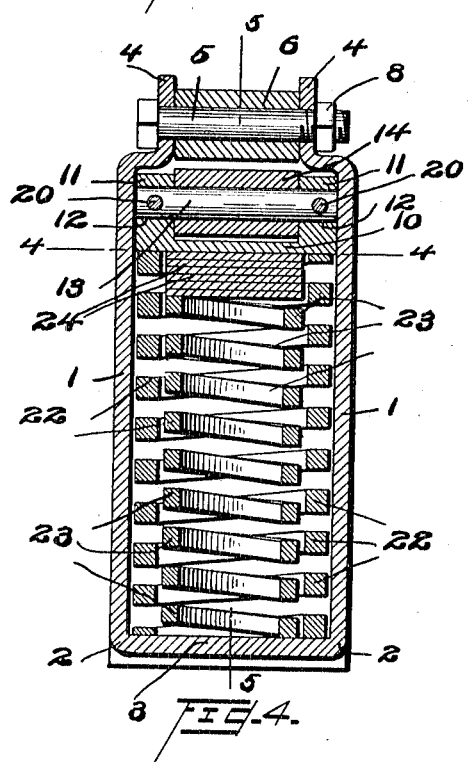
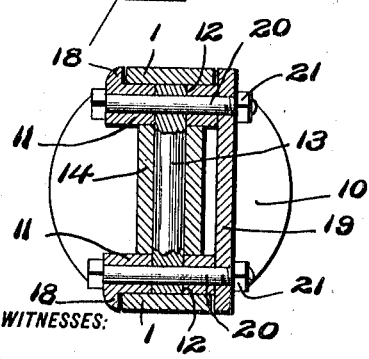
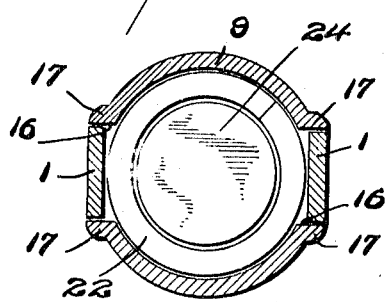
WITNESSES:
Harold Strauss
C. R. Ziegler.
INVENTOR
Allen E. Hall
BY
Joshua R. H. Potts.
ATTORNEY

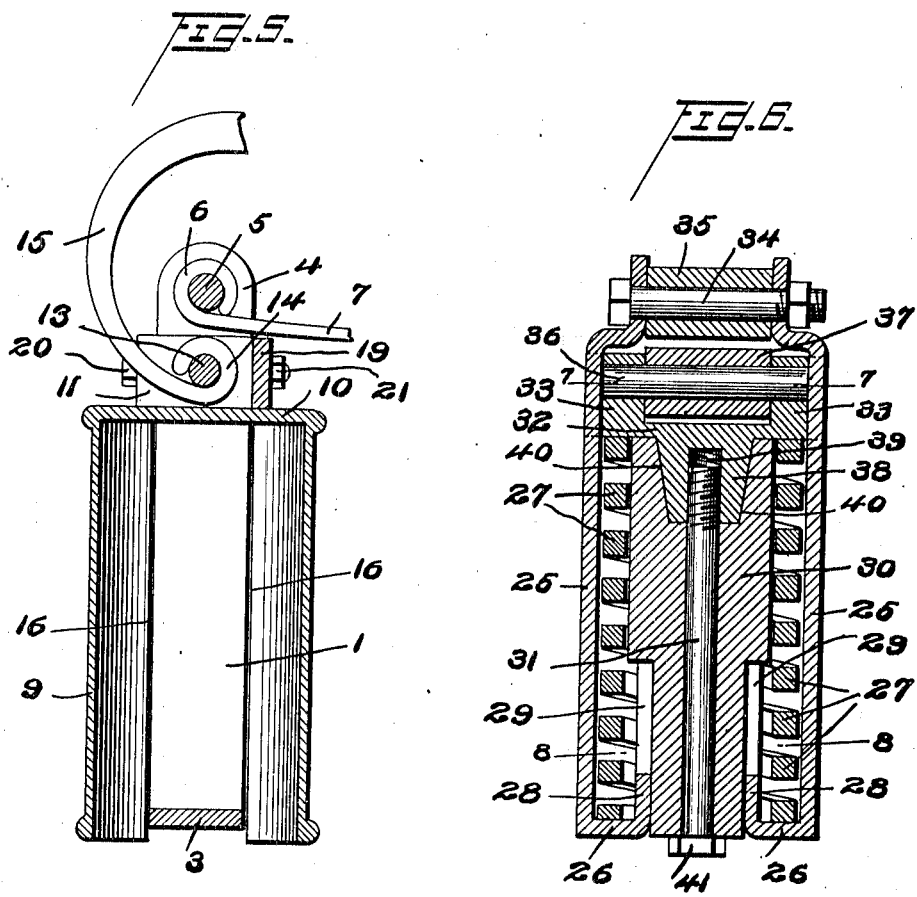

UNITED STATES PATENT OFFICE.

ALLEN E. HALL, OF PHILADELPHIA, PENNSYLVANIA.

SHOCK-ABSORBER.

1,102,265.   Specification of Letters Patent.   Patented July 7, 1914.

Application filed June 24, 1913. Serial No. 775,453.

*To all whom it may concern:*

Be it known that I, ALLEN E. HALL, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide an extremely simple, yet efficient device of this character which may be attached to any ordinary automobile or other similar vehicle, and which will absorb shocks and vibrations and cushion the connection between the spring and the scroll of the vehicle.

A further object is to provide an improved shock absorber comprising a frame positioned around and engaging the lower end of a coiled spring, the upper end of said spring bearing against the block or head, movable inside the frame, said head and said frame connected to different supporting devices, so that the spring absorbs shocks and vibrations between said parts.

A further object is to provide a shock absorber of this character which may be manufactured and sold at a reasonably low price, which is neat and attractive in appearance, and which is strong and durable in use.

With these and other objects in view, the invention consists in certain novel features of construction and combinations and arrangements of parts as will be more fully hereinafter described and pointed out in the claims.

In the accompanying drawings: Figure 1 is a view in side elevation illustrating one form of my improvements. Fig. 2 is a view in section on the line 2—2 of Fig. 1. Fig. 3 is a view in section on the line 3—3 of Fig. 1. Fig. 4 is a view in section on the line 4—4 of Fig. 2. Fig. 5 is a view in section on the line 5—5 of Fig. 2, but showing the springs and washers removed. Fig. 6 is a view similar to Fig. 2 illustrating a modification. Fig. 7 is a view in section on the line 7—7 of Fig. 6, and Fig. 8 is a view in section on the line 8—8 of Fig. 6.

Referring to Figs. 1, 2, 3, 4, and 5, 1 represents a frame comprising a single bar of metal bent at right angles at two points between its ends as shown at 2 forming a horizontal intermediate portion 3 which constitutes the bottom of the frame when in use. The free ends of the bars which are at the upper end of the frame are bent inwardly and then extend upwardly forming parallel perforated ears 4 to receive a bolt 5 which is adapted to be projected through the eye 6 of a spring 7 and secured in place by means of a nut 8. Within the frame 1, a cylindrical casing 9 is located, and is provided at its upper end with a closed head 10. This head 10 is made with integral upwardly projecting lugs 11, the latter having alined openings 12 for the reception of a pin 13, which latter projects through the eye 14 of the scroll 15. Casing 9 has an open lower end, and is provided in opposite sides with slots 16 as clearly shown in Figs. 1, 4, and 5, so that the bottom 3 of frame 1 may move freely longitudinally of the casing 9. At the walls of the slots 16, the casing 9 is provided with longitudinal guide flanges 17, between which the side members of frame 1 are located, so that the construction is thereby strengthened against torsional strains, and the casing and frame are maintained in alinement. One of each pair of said flanges 17 extends above the head 10 and constitutes an integral part of lug 11 as shown at 18, and secured to said lugs 11 and bearing against the edges of the side members of frame 1, is a plate 19. This plate 19 is secured by bolts 20 to the lugs 11, said bolts projecting through alined openings in the lugs and in pin 13, preventing any rotary movement of pin 13. Nuts 21 are screwed onto the bolts 20 and bear against plate 19, pressing said plate against frame 1, and by adjusting these nuts, wear may be taken up, and a nice adjustment had at all times. Inside of casing 9, a relatively large coiled spring 22 is located and bears at its upper end against head 10, while its lower end bears upon the bottom 3 of frame 1. Inside of spring 22, a relatively small spring 23 is located. The lower end of this spring 23 bears against the bottom 3 of frame 1, but between the upper end of this spring 23 and head 10, a plurality of washers 24 are located. By removing one or more of these washers, the tension of spring 23 may be adjusted so as to give just the proper tension to the shock absorber in accordance with the load. Devices of this kind require some adjustment in order to accommodate themselves to the particular vehicle on which they are used. By providing this arrangement of washers 24, the desired tension may be had, and furthermore by such an arrangement of parts, I am enabled to utilize a spring 22 which is common in tension to all devices. To regulate or adjust the tension of the shock absorber, I merely adjust the tension of the inner spring 23.

In the modification illustrated in Figs. 6, 7, and 8, I dispense with the casing 9, and provide a two-part frame 25. This frame 25 consists of two members both precisely alike, each member comprising a bar having its lower end bent horizontally forming a frame bottom 26 against which the lower end of a coiled spring 27 bears. The extreme ends of the bars at the bottom 26 are bent upwardly forming tongues 28 which ride in longitudinal grooves 29 in a central block 30. This block 30 is preferably of wood, and is secured by a bolt 31 to a head 32 which corresponds to the head 10 of casing 9 of the preferred form. This head 32 has grooved lugs 33 thereon in which the frame 25 is movable, and the upper end of the frame 25 is connected by a bolt 34 with the eye of a spring 35, and lugs 33 are connected by a pin 36 which projects through the eye of a scroll 37. The head 32 is formed on its lower face with a conical extension 38 having a screw-threaded socket 39 therein to receive the threaded upper end of bolt 31. The block 30 is recessed as shown at 40 to receive the extension 38 and the head 41 of bolt 31 bears against the lower end of block 30, so that by turning this bolt in one direction, the block may be pressed tightly against the head 32. It will be noted that the block 30 not only acts as a guide for the coiled spring 27, but it also guides the vertical movement of frame 25. This frame 25 while in this modification comprises two members, operates in precisely the same manner as frame 1 of the preferred form which constitutes a single member.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A shock absorber comprising a frame, adapted to be connected to a support, a head movable relative to the frame, a spring between the lower end of the frame and the head, lugs on the head, and a plate adjustably secured to both lugs and bearing against the edge of the frame, substantially as described.

2. A shock absorber comprising a frame, adapted to be connected to a support, a head movable relative to the frame, a spring between the lower end of the frame and the head, lugs on the head, a plate adjustably secured to both lugs and bearing against the edge of the frame, and a casing carried by the head and inclosing the spring, said casing having longitudinal slots therein in which the frame is movable, substantially as described.

3. A shock absorber comprising a frame adapted to be connected at its upper end to a support, a head movable inside of the frame, upwardly projecting lugs on the head, a pin mounted in said lugs and adapted to be connected to a support, and a coiled spring located within the frame, bearing at one end against the frame, and at its other end against the head, and a plate adjustably secured to both lugs and bearing against the edge of said frame, and a casing carried by the head and inclosing the spring, substantially as described.

4. A shock absorber comprising a frame adapted to be connected at its upper end to a support, a head movable inside of the frame, upwardly projecting lugs on the head, a pin mounted in said lugs and adapted to be connected to a support, said pin held against longitudinal movement by the frame and a coiled spring located within the frame, bearing at one end against the frame, and at its other end against the head, and a plate adjustably secured to said lugs and bearing against said frame, substantially as described.

5. A shock absorber comprising a head adapted to be connected to a supporting device, a frame adapted to be connected to a supporting device, said frame extending below and movable relative to the head, a coiled spring inside of the frame bearing at one end against the head and at its other end against the frame, a casing integral with the head, said casing inclosing the spring and having an open bottom, and longitudinally slotted sides in which said frame is movable, substantially as described.

6. A shock absorber comprising a head adapted to be connected to a supporting device, a frame adapted to be connected to the supporting device, said frame extending below and movable relative to the head, said head having recesses in its sides in which the frame is guided, a coiled spring inside the frame interposed between the head and the frame, a casing integral with the head, said casing inclosing the spring and having an open bottom, and longitudinally slotted sides in which said frame is movable, substantially as described.

7. A shock absorber comprising a frame adapted to be connected at its upper end to a support, a head movable inside the frame and adapted to be connected to a support, a coiled spring inside the frame located between the head and the frame, a second coiled spring inside of the first-mentioned spring, a plurality of washers against which one end of said coiled spring bears, whereby the tension of said inner spring may be adjusted, a casing integral with the head, said casing inclosing the springs and having an open bottom, and longitudinally slotted sides in which said frame is movable, substantially as described.

8. A shock absorber comprising a frame adapted to be connected at its upper end to a support, a head movable inside of the frame, upwardly projecting lugs on the head, a pin mounted in said lugs and adapted to be connected to a support, a coiled spring located within the frame, bearing at one end against the frame, and at its other end against the head, a casing integral with the head, said casing inclosing the spring and having an open bottom, and longitudinally slotted sides in which said frame is movable, substantially as described.

9. A shock absorber comprising a frame having its side members at its upper end bent inwardly and then upwardly, a bolt projected through said upper end of the frame and adapted to be connected to a spring, a head movable inside of the frame below said inwardly bent upper end, lugs on said head, a pin projected through said lugs and adapted to be positioned through the eye of a scroll, a coiled spring inside of the frame bearing at its lower end against the frame and at its upper end against said head, a casing integral with the head, said casing inclosing the spring and having an open bottom and longitudinally slotted sides in which said frame is movable, substantially as described.

10. A shock absorber comprising a frame adapted to be connected at its upper end to a support, a head movable inside of the frame, upwardly projecting lugs on the head, a pin mounted in said lugs and adapted to be connected to a support, a coiled spring located within the frame, bearing at one end against the frame, and at its other end against the head, a plate adjustably secured to said lugs and bearing against said frame, a casing integral with the head, said casing inclosing the spring and having an open bottom and longitudinally slotted sides in which said frame is movable, substantially as described.

In testimony whereof I have signed my name to this specification in the presence of two subscribing witnesses.

ALLEN E. HALL.

Witnesses:
M. E. DITTUS,
CHAS. E. POTTS.

Copies of this patent may be obtained for five cents each, by addressing the "Commissioner of Patents, Washington, D. C."